United States Patent
Kayano et al.

(10) Patent No.: US 9,735,631 B2
(45) Date of Patent: Aug. 15, 2017

(54) EMBEDDED PERMANENT MAGNET ROTARY ELECTRIC MACHINE

(75) Inventors: Shinsuke Kayano, Chiyoda-ku (JP); Masaya Inoue, Chiyoda-ku (JP); Shinji Nishimura, Chiyoda-ku (JP); Moriyuki Hazeyama, Chiyoda-ku (JP); Takuma Sasai, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 358 days.

(21) Appl. No.: 14/390,701

(22) PCT Filed: May 22, 2012

(86) PCT No.: PCT/JP2012/063069
§ 371 (c)(1),
(2), (4) Date: Oct. 3, 2014

(87) PCT Pub. No.: WO2013/175575
PCT Pub. Date: Nov. 28, 2013

(65) Prior Publication Data
US 2015/0091407 A1    Apr. 2, 2015

(51) Int. Cl.
*H02K 1/27* (2006.01)
*H02K 29/03* (2006.01)

(52) U.S. Cl.
CPC .......... *H02K 1/2706* (2013.01); *H02K 1/276* (2013.01); *H02K 1/2766* (2013.01); *H02K 29/03* (2013.01)

(58) Field of Classification Search
CPC ........ H02K 1/22; H02K 1/2706; H02K 21/12; H02K 21/14; H02K 21/16
(Continued)

(56) References Cited

U.S. PATENT DOCUMENTS 7,417,348 B2 *  8/2008  Taniguchi .............. H02K 1/276
                                                  310/156.53
7,598,645 B2 * 10/2009  Ley ...................... H02K 1/2766
                                                  310/156.38
(Continued)

FOREIGN PATENT DOCUMENTS

CN    1388623 A    1/2003
CN  102138273 A    7/2011
(Continued)

OTHER PUBLICATIONS

International Search Report of PCT/JP2012/063069 dated Aug. 21, 2012.
(Continued)

*Primary Examiner* — Tran Nguyen
(74) *Attorney, Agent, or Firm* — Sughrue Mion, PLLC; Richard C. Turner (57) ABSTRACT

Permanent magnets that constitute the single magnetic poles are constituted by n permanent magnet segments, the n permanent magnet segments being configured such that shapes and directions of orientation thereof have mirror symmetry relative to a plane that passes through a magnetic pole center and that includes a central axis of the rotor core, and being oriented such that a permanent magnet segment that is further away from the magnetic pole center in a circumferential direction has a smaller angle of orientation, and the permanent magnet segment that is positioned further away from the magnetic pole center in the circumferential direction being produced so as to have an approximately fan-shaped cross-sectional shape in which a radial width is wider than a circumferential width.

11 Claims, 9 Drawing Sheets

(58) Field of Classification Search
USPC .................... 310/156.08, 156.38–156.45
See application file for complete search history.

(56) References Cited

U.S. PATENT DOCUMENTS

| | | | | |
|---|---|---|---|---|
| 7,768,171 B2* | 8/2010 | Taniguchi | ............. | H02K 1/276 |
| | | | | 310/156.53 |
| 7,843,101 B2* | 11/2010 | Ito | ........................ | H02K 1/2766 |
| | | | | 310/156.46 |
| 2002/0180294 A1* | 12/2002 | Kaneda | ................ | H02K 1/2786 |
| | | | | 310/156.43 |
| 2002/0180295 A1* | 12/2002 | Kaneda | ................ | H02K 1/2786 |
| | | | | 310/156.43 |
| 2007/0126304 A1* | 6/2007 | Ito | ........................ | H02K 1/2766 |
| | | | | 310/156.53 |
| 2010/0019597 A1* | 1/2010 | Kolehmainen | ...... | H02K 1/2766 |
| | | | | 310/156.11 |
| 2010/0225191 A1 | 9/2010 | Hiroshi | | |
| 2011/0012461 A1* | 1/2011 | Tomigashi | ............. | H02K 1/276 |
| | | | | 310/156.01 |
| 2011/0057533 A1* | 3/2011 | Murakami | ........... | H02K 1/2766 |
| | | | | 310/156.43 |
| 2013/0002081 A1* | 1/2013 | Zhang | ................. | H02K 1/2766 |
| | | | | 310/156.38 |

FOREIGN PATENT DOCUMENTS

| | | |
|---|---|---|
| CN | 102340197 A | 2/2012 |
| JP | 09-121485 A | 5/1997 |
| JP | 10-094202 A | 4/1998 |
| JP | 2002-335643 A | 11/2002 |
| JP | 3487667 B2 | 1/2004 |
| JP | 2005-45984 A | 2/2005 |
| JP | 2008-271652 A | 11/2008 |
| JP | 2008-283806 A | 11/2008 |
| JP | 2009-219312 A | 9/2009 |
| JP | 2010-207067 A | 9/2010 |
| JP | 2012-029563 A | 2/2012 |
| WO | 2012/008012 A1 | 1/2012 |

OTHER PUBLICATIONS

Communication dated May 11, 2016 from the State Intellectual Property Office of the P.R.C. in counterpart application No. 201280073396.1.

Communication dated Dec. 27, 2016 from the State Intellectual Property Office of the P.R.C. in counterpart application No. 201280073396.1.

* cited by examiner

EMBEDDED PERMANENT MAGNET ROTARY ELECTRIC MACHINE

CROSS REFERENCE TO RELATED APPLICATIONS

This is a National Stage of International Application No. PCT/JP2012/063069 filed May 22, 2012, the contents of which are incorporated herein by reference in its entirety.

TECHNICAL FIELD

The present invention relates to an embedded permanent magnet rotary electric machine that is used in a motor of an electric vehicle (EV) or a hybrid electric vehicle (HEV), for example.

BACKGROUND ART

In conventional embedded permanent magnet rotary electric machines, a plurality of holding apertures that extend axially are disposed at a uniform pitch circumferentially on a portion of a rotor main body near a surface layer on a side that faces a stator, main magnets and auxiliary magnets are separately inserted into and fixed to these holding apertures, and the main magnets and the auxiliary magnets are arranged sequentially in order of a main magnet that has radially outward polarity, an auxiliary magnet that has circumferentially counterclockwise polarity, a main magnet that has radially inward polarity, an auxiliary magnet that has circumferentially clockwise polarity so as to be repeated for two iterations, i.e., are arranged in a "Halbach array" (see Patent Literature 1, for example).

In other conventional embedded permanent magnet rotary electric machines, a plurality of rectangular permanent magnets are embedded into an outer circumferential portion of a rotor main body so as to be perpendicular to a radial direction of a rotor, the rectangular permanent magnets are configured by abutting a plurality of permanent magnet segments, a magnetic pole direction of a central permanent magnet segment is oriented in the radial direction of the rotor, and magnetic pole directions of other permanent magnet segments are oriented in directions that converge approximately on a single point on a magnetic pole direction line of the central permanent magnet segment (see Patent Literature 2, for example).

CITATION LIST

Patent Literature

[Patent Literature 1] Japanese Patent Laid-Open No. 2009-219312 (Gazette)
[Patent Literature 2] Japanese Patent No. 3487667 (Gazette)

SUMMARY OF THE INVENTION

Problem to be Solved by the Invention

In a conventional embedded permanent magnet rotary electric machine according to Patent Literature 1, because the auxiliary magnets that constitute part of adjacent magnetic poles are configured into an integrated body without being divided, centrifugal forces that act on the auxiliary magnets are increased. If bridge widths on outer circumferential sides of the magnets or rib widths between the magnets are enlarged in order to accommodate high-speed rotation, torque is reduced. Furthermore, if the rib widths are enlarged, harmonics are generated in a surface flux density distribution (hereinafter called "open flux") of the rotor, increasing cogging torque and torque ripple. Increased torque ripple leads to deterioration in riding comfort.

In a conventional embedded permanent magnet rotary electric machine according to Patent Literature 2, because a plurality of permanent magnet segments that constitute a magnetic pole are accommodated in a single magnet accommodating aperture, the open flux has a flat shape. However, because the weight of the permanent magnets that are accommodated in each of the magnet accommodating apertures is increased, the centrifugal forces that act on the bridges on the outer circumferential sides of the permanent magnets and the moments that act on the ribs via the bridges are increased during high-speed rotation. If the bridge widths and the rib widths are enlarged in order to accommodate high-speed rotation, torque is reduced.

The present invention aims to solve the above problems and an object of the present invention is to provide an embedded permanent magnet rotary electric machine that can achieve increased strength, increased torque, and reduced torque ripple in a rotor core.

Means for Solving the Problem

In order to achieve the above object, according to one aspect of the present invention, there is provided an embedded permanent magnet rotary electric machine including: a stator including: an annular stator core; and a stator coil that is mounted onto the stator core; and a rotor including: a cylindrical rotor core; and a plurality of permanent magnets that constitute respective single magnetic poles that are embedded into an outer circumferential side of the rotor core so as to be arranged at a uniform angular pitch circumferentially, the rotor being rotatably disposed on an inner circumferential side of the stator. The permanent magnets that constitute the single magnetic poles are constituted by n permanent magnet segments that are arranged in a circular arc shape circumferentially, where n is an integer that is greater than or equal to 3, and the n permanent magnet segments are individually accommodated and held in magnet holding apertures that are disposed through the rotor core so as to have aperture directions in an axial direction. The n permanent magnet segments are configured such that shapes and directions of orientation thereof have mirror symmetry relative to a plane that passes through a magnetic pole center and that includes a central axis of the rotor core. The n permanent magnet segments are oriented such that a permanent magnet segment that is further away from the magnetic pole center in a circumferential direction has a smaller angle of orientation. In addition, the permanent magnet segment that is positioned further away from the magnetic pole center in the circumferential direction is produced so as to have an approximately fan-shaped cross-sectional shape in which a radial width is wider than a circumferential width.

Effects of the Invention

According to the present invention, permanent magnets that constitute single magnetic poles are constituted by n permanent magnet segments that are arranged in a single row in a circular arc shape circumferentially, and the n permanent magnet segments are individually accommodated and held in magnet holding apertures that are disposed through the rotor core so as to have aperture directions in an axial direction. Thus, centrifugal forces that act through the permanent magnet segments during rotation of the rotor on outer circumferential bridges that are positioned on an outer circumferential side of the permanent magnet segments are reduced, increasing resistance of the rotor core to centrifugal forces, enabling the rotor core to handle high-speed rotation.

The n permanent magnet segments are configured such that shapes and directions of orientation thereof have mirror symmetry relative to a plane that passes through a magnetic pole center and that includes a central axis of the rotor core, and are oriented such that permanent magnet segments that are further away from the magnetic pole center in a circumferential direction have a smaller angle of orientation. Thus, the directions of orientation of the n permanent magnet segments that are arranged in a circular arc shape in a single row circumferentially are oriented toward the magnetic pole center, increasing the amount of magnetic flux, and enabling increased torque to be achieved, and open flux also approaches a sine wave, reducing torque ripple.

Because the permanent magnet segments that are positioned further away from the magnetic pole center in the circumferential direction are produced so as to have approximately fan-shaped cross-sectional shapes in which a radial width is wider than a circumferential width, the amount of magnetic flux is increased, enabling increased torque to be achieved.

DESCRIPTION OF EMBODIMENTS

Preferred embodiments of the embedded permanent magnet rotary electric machine according to the present invention will now be explained with reference to the drawings.

Embodiment 1

Figure 1:
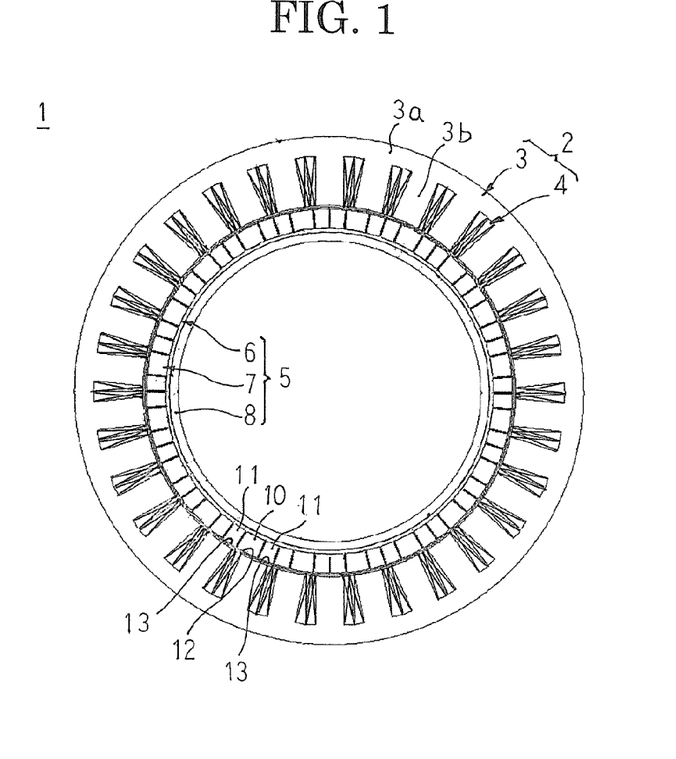
FIG. 1 is a cross section that shows an embedded permanent magnet rotary electric machine according to Embodiment 1 of the present invention.
Figure 2:
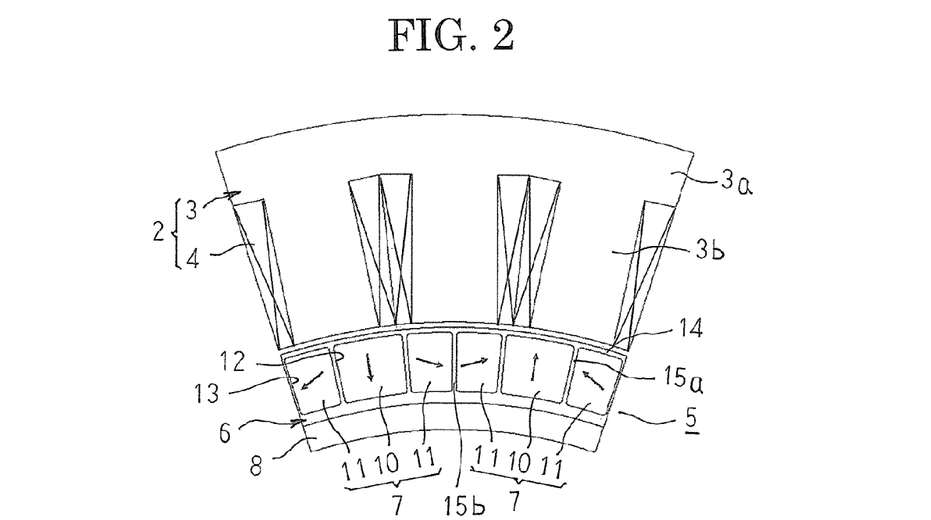
FIG. 2 is a partial cross section that explains arrangement of permanent magnets of the embedded permanent magnet rotary electric machine according to Embodiment 1 of the present invention.
Figure 3:
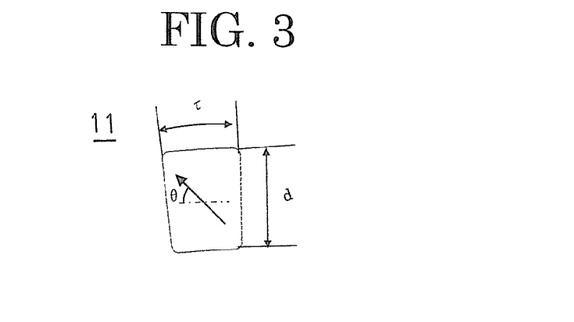
FIG. 3 is a diagram that explains orientation of permanent magnets in the embedded permanent magnet rotary electric machine according to Embodiment 1 of the present invention.

FIG. 1 is a cross section that shows an embedded permanent magnet rotary electric machine according to Embodiment 1 of the present invention, FIG. 2 is a partial cross section that explains arrangement of permanent magnets of the embedded permanent magnet rotary electric machine according to Embodiment 1 of the present invention, and FIG. 3 is a diagram that explains orientation of permanent magnets in the embedded permanent magnet rotary electric machine according to Embodiment 1 of the present invention. Moreover, in FIGS. 2 and 3, arrows represent directions of magnetization, and directions that do not have arrows are directions of orientation.

In FIGS. 1 and 2, an embedded permanent magnet rotary electric machine (hereinafter simply "the rotary electric machine") 1 includes: a stator 2; and a rotor 5 that is rotatably disposed in an internal portion of the stator 2. In this case, a twenty-pole, thirty-slot rotary electric machine will be explained, but the number of poles and the number of slots are not limited thereto.

The stator 2 is produced by laminating electromagnetic steel sheets, for example, and includes: a stator core 3 in which teeth 3b are respectively arranged so as to project radially inward from an inner circumferential wall surface of an annular core back 3a at a uniform angular pitch circumferentially; and a stator coil 4 that is constituted by concentrated winding coils that are produced by winding a conductor wire onto each of the teeth 3b.

The rotor 5 includes: an annular rotor core 6 that is configured by laminating electromagnetic steel sheets, for example; a plurality of permanent magnets 4 that are embedded near an outer circumferential surface of the rotor core 6 so as to extend axially so as to be disposed at a uniform angular pitch circumferentially; and an annular boss portion 8 onto which the rotor core 6 is fitted and held thereby.

Each of the permanent magnets 7 is constituted by: a first permanent magnet segment 10 that is formed into a prism that has a fan-shaped cross section; and two second permanent magnet segments 11 that are formed into prisms that have fan-shaped cross sections, that are disposed on two circumferential sides of the first permanent magnet segment 10. A single magnetic pole is configured by arranging the first permanent magnet segment 10 and the two second permanent magnet segments 11 into a circular arc shape. Moreover, the first permanent magnet segment 10 and the second permanent magnet segments 11 are respectively accommodated and held in magnet holding apertures 12 and 13 that are disposed through the rotor core 6 so as to have aperture directions in an axial direction.

The first permanent magnet segments 10 are positioned centrally on the magnetic poles, and directions of orientation thereof are in a radial direction in a plane that is perpendicular to a central axis of the rotor core 6. As shown in FIG. 3, directions of orientation of the second permanent magnet segments 11 are inclined at an angle (an angle of orientation) θ relative to a circumferential direction (a direction that is perpendicular to the radial direction) in a plane that is perpendicular to the central axis of the rotor core 6. Directions of orientation that pass through central positions of the first permanent magnet segments 10 and the second permanent magnet segments 11 are directions that intersect approximately at a single point on radial lines that pass through the centers of the magnetic poles. Radial widths d of the second permanent magnet segments 11 are wider than circumferential widths τ. Moreover, radial widths of the first permanent magnet segments 10 are equal to those of the second permanent magnet segments 11, and circumferential widths thereof are wider than those of the second permanent magnet segments 11.

Moreover, shapes, directions of orientation, and directions of magnetization of the permanent magnets 7 that are constituted by the first permanent magnet segments 10 and the second permanent magnet segments 11 are configured so as to have mirror symmetry relative to planes that pass through the centers of the magnetic poles and that include the central axis of the rotor core 6. In addition, the shapes and directions of orientation of circumferentially adjacent permanent magnets 7 are configured so as to have mirror symmetry relative to planes that pass through the centers of interpolar ribs 15b and that include the central axis of the rotor core 6.

The permanent magnets 7 that are constituted by the first permanent magnet segments 10 and the second permanent magnet segments 11 are arranged at a uniform angular pitch on the rotor core 6 such that polarity of an outer circumferential portion of the rotor core 6 at the centers of the magnetic poles is aligned alternately into North-seeking (N) poles and South-seeking (S) poles circumferentially.

In the rotary electric machine 1 that is configured in this manner, because the permanent magnets 7 that constitute single magnetic poles are configured so as to be divided into a single first permanent magnet segment 10 and two second permanent magnet segments 11, the weight of the first permanent magnet segments 10 and the two second permanent magnet segments 11 can be reduced compared to when the permanent magnets 7 are produced using a single permanent magnet. The single first permanent magnet segment 10 and the two second permanent magnet segments 11 are housed and held in the respective magnet holding apertures 12 and 13. Thus, the centrifugal forces that act through the first permanent magnet segments 10 and the second permanent magnet segments 11 on the outer circumferential bridges 14 that are positioned on outer circumferential sides of the first permanent magnet segments 10 and the second permanent magnet segments 11 during high-speed rotation are reduced. In addition, moments that act through the outer circumferential bridges 14 on the inter-magnet ribs 15a between the first permanent magnet segments 10 and the second permanent magnet segments 11, and on the interpolar ribs 15b that are positioned between and the second permanent magnet segments 11, are reduced. Consequently, resistance of the rotor core 6 to centrifugal forces is increased, enabling the rotor 5 that can handle high-speed rotation to be achieved.

Because the radial widths d of the second permanent magnet segments 11 are formed so as to be wider than the circumferential widths τ, volume is equal and cross-sectional area perpendicular to the direction of orientation is increased compared to when the radial widths d and the circumferential widths τ are equal, increasing the amount of magnetic flux, and enabling increased torque to be achieved.

Because directions of orientation that pass through central positions of the first permanent magnet segments 10 and the second permanent magnet segments 11 intersect approximately at a single point on the radial lines that pass through the centers of the magnetic poles, the amount of magnetic flux is increased, enabling increased torque to be achieved, and open flux also approaches a sine wave, reducing torque ripple.

Figure 4:
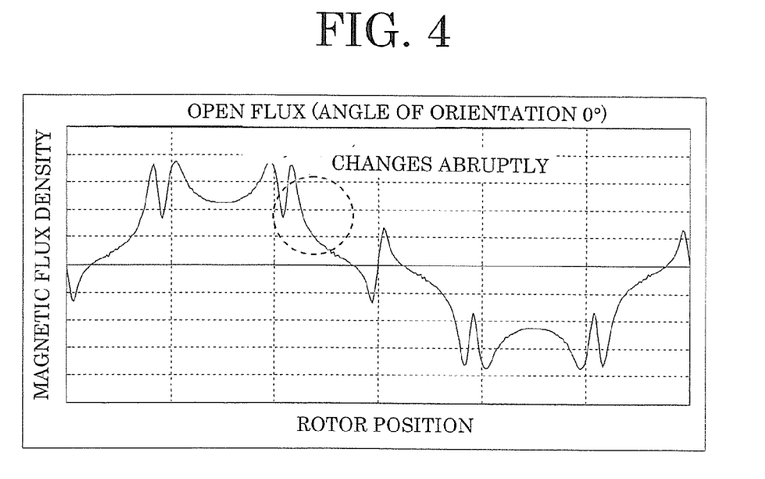
FIG. 4 is a graph that shows results of measurements of open flux in a rotary electric machine that uses permanent magnet segments in which an angle of orientation θ is 0 degrees as second permanent magnet segments.
Figure 5:
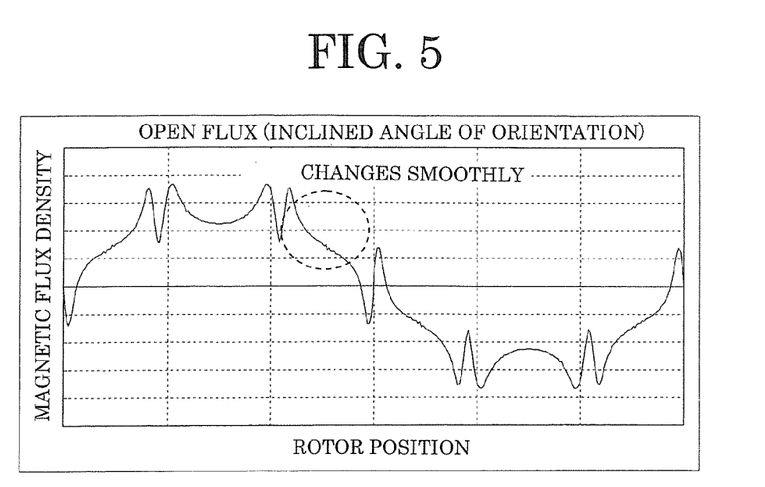
FIG. 5 is a graph that shows results of measurements of open flux in a rotary electric machine that uses permanent magnet segments in which an angle of orientation θ is 30 degrees as second permanent magnet segments.
Figure 6:
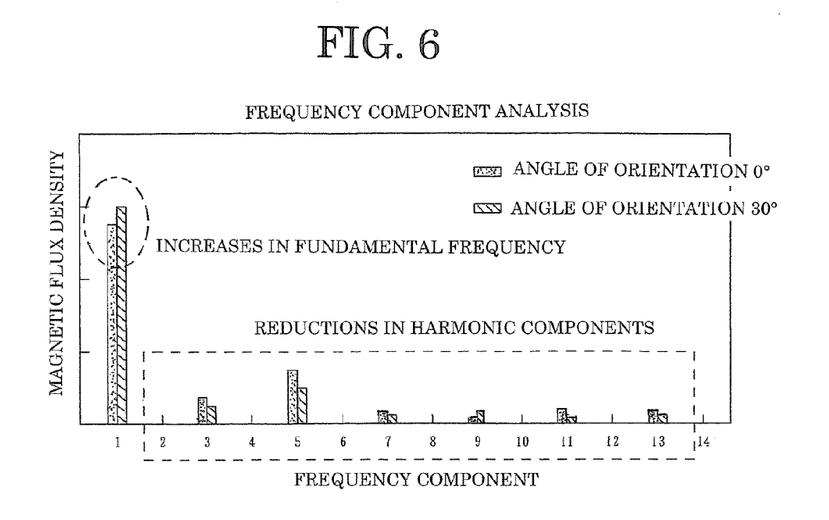
FIG. 6 is a graph that shows results of analysis of open flux in rotary electric machines that use permanent magnet segments in which an angle of orientation θ is 0 degrees and 30 degrees as second permanent magnet segments.

Next, a relationship between the angle of orientation θ of the second permanent magnet segments 11 that are disposed on both circumferential sides of the first permanent magnet segments 10 and the open flux will be investigated based on FIGS. 4 through 6. FIG. 4 is a graph that shows results of measurements of open flux in a rotary electric machine that uses permanent magnet segments in which an angle of orientation θ is 0 degrees as second permanent magnet segments, FIG. 5 is a graph that shows results of measurements of open flux in a rotary electric machine that uses permanent magnet segments in which an angle of orientation θ is 30 degrees as second permanent magnet segments, and FIG. 6 is a graph that shows results of analysis of open flux in rotary electric machines that use permanent magnet segments in which an angle of orientation θ is 0 degrees and 30 degrees as second permanent magnet segments. Moreover, a stator that has an outside diameter of ø 290 mm and an inside diameter of ø 212 mm, a rotor that has an outside diameter of ø 210 mm and an inside diameter of ø 182 mm, and magnets that have a residual magnetic flux density of 0.875 T were used.

It was ascertained that if the angle of orientation θ of the second permanent magnet segments 11 is 0 degrees, open flux changes rapidly in a region that is indicated by a broken line portion in FIG. 4, i.e., a region of the second permanent magnet segments 11. On the other hand, it was ascertained that if the angle of orientation θ of the second permanent magnet segments 11 is 30 degrees, open flux changes gently in a region that is indicated by a broken line portion in FIG. 5, i.e., a region of the second permanent magnet segments 11. Thus, it can be seen that the waveform of the open flux approaches a sine wave as the angle of orientation θ of the second permanent magnet segments 11 is increased from 0 degrees.

From FIG. 6, it was ascertained that when the angle of orientation θ of the second permanent magnet segments 11 is 30 degrees, the magnetic flux density of the fundamental wave (a first-order component) is greater than when the angle of orientation θ of the second permanent magnet segments 11 is 0 degrees. Thus, it can be seen that torque is increased by changing the angle of orientation θ of the second permanent magnet segments 11 from 0 degrees to 30 degrees.

From FIG. 6, it was ascertained that when the angle of orientation θ of the second permanent magnet segments 11 is 30 degrees, the magnetic flux density of higher-order components that are a primary factor in torque ripple is less than when the angle of orientation θ of the second permanent magnet segments 11 is 0 degrees. Thus, it can be seen that torque ripple can be reduced and riding comfort improved by changing the angle of orientation θ of the second permanent magnet segments 11 from 0 degrees to 30 degrees.

Figure 7:
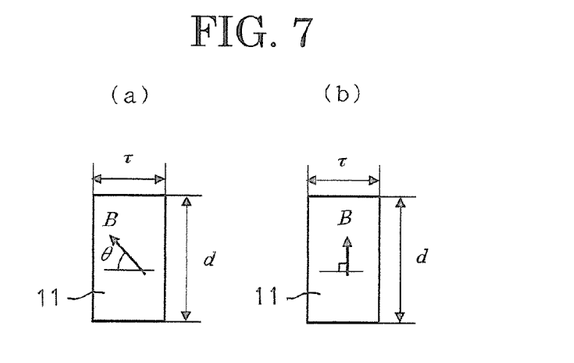
FIGS. 7A and 7B are cross sections that explain amounts of magnetic flux that enter and leave a second permanent magnet.

Next, the angle of orientation θ of the second permanent magnet segments 11 will be investigated based on FIGS. 7A and 7B. FIGS. 7A and 7B are cross sections that explain amounts of magnetic flux that enter and leave a second permanent magnet, FIG. 7A showing a case in which the angle of orientation θ is greater than 0 degrees and less than 90 degrees, and FIG. 7B showing a case in which the angle of orientation θ is 90 degrees.

In the case that is shown in FIG. 7A the amount of magnetic flux that enters and leaves the second permanent magnet segments 11 is expressed by (BdL$_c$ cos θ+BτL$_c$ sin θ). Here, BdL$_c$ cos θ is the amount of magnetic flux in the circumferential direction, and BτL$_c$ sin θ is the amount of magnetic flux in the radial direction. Moreover, B is the magnetic flux density in the direction of orientation of the second permanent magnet segments 11, and L$_c$ is an axial length of the second permanent magnet segments 11.

In the case that is shown in FIG. 7B the amount of magnetic flux that enters and leaves the second permanent magnet segments 11 is expressed by BτL$_c$.

Thus, the amount of magnetic flux that enters and leaves the second permanent magnet segments 11 can be increased, enabling torque to be increased, by setting the angle of orientation θ, the circumferential width τ, and the radial width d of the second permanent magnet segments 11 so as to satisfy the following expression:

$$(BdL_c \cos θ + BτL_c \sin θ) > BτL_c$$

Reducing the above expression gives the following expression:

$$d \cos θ + τ(\sin θ - 1) > 0$$

Figure 8:
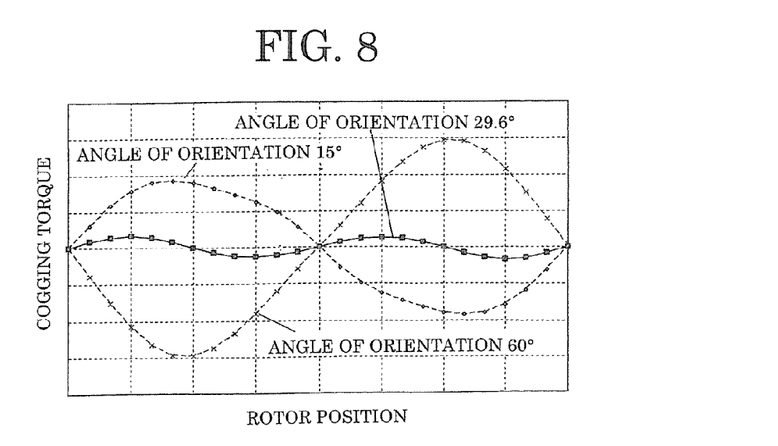
FIG. 8 is a graph that shows results of analysis of cogging torque using the angle of orientation θ of the second permanent magnet segments as a parameter.
Figure 9:
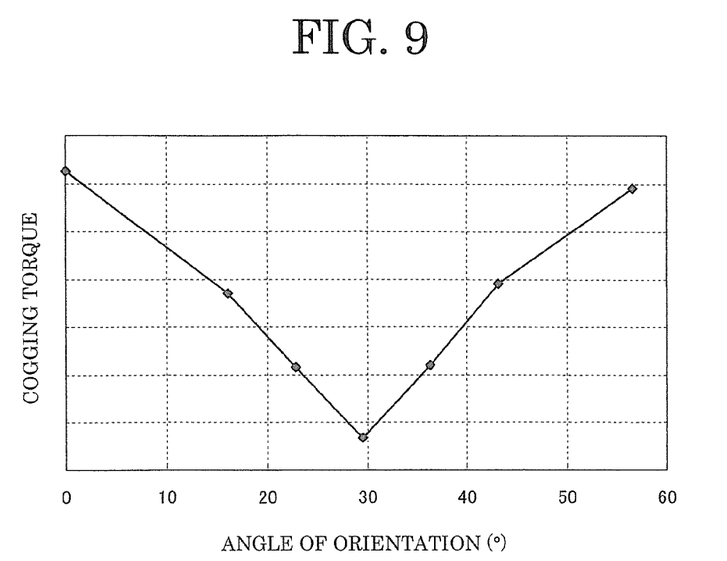
FIG. 9 is a graph that shows results of measuring cogging torque with different angles of orientation θ in the second permanent magnet segments.
Figure 10:
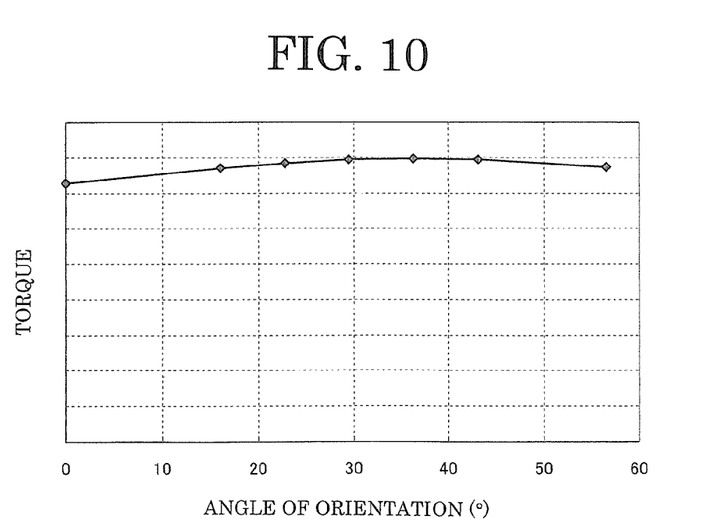
FIG. 10 is a graph that shows results of measuring torque with different angles of orientation θ in the second permanent magnet segments.

Next, relationships between angle of orientation θ of the second permanent magnet segments 11 and cogging torque and between angle of orientation θ and torque will be investigated based on FIGS. 8 through 10. FIG. 8 is a graph that shows results of analysis of cogging torque using the angle of orientation θ of the second permanent magnet segments as a parameter, FIG. 9 is a graph that shows results of measuring cogging torque with different angles of orientation θ in the second permanent magnet segments, and FIG. 10 is a graph that shows results of measuring torque with different angles of orientation θ in the second permanent magnet segments. Moreover, a stator that has an outside diameter of ⌀290 mm and an inside diameter of ⌀212 mm, a rotor that has an outside diameter of ⌀210 mm and an inside diameter of ⌀182 mm, and magnets that have a residual magnetic flux density of 0.875 T were used. The angle of orientation θ of the first permanent magnet segments 10 is 90 degrees.

From FIG. 8, it was ascertained that the phase of the waveform of the cogging torque when the angle of orientation θ of the second permanent magnet segments 11 is 15 degrees and the phase of the waveform of the cogging torque when the angle of orientation θ of the second permanent magnet segments 11 is 60 degrees are inverted. It was also ascertained that the cogging torque is approximately 0 when the angle of orientation θ of the second permanent magnet segments 11 is 29.6 degrees.

From FIG. 9, it was found that cogging torque decreases slowly as the angle of orientation θ of the second permanent magnet segments 11 increases from 0 degrees, decreases rapidly when the angle of orientation θ exceeds 15 degrees, reaches a minimum value when the angle of orientation θ is 29.6 degrees, increases rapidly when the angle of orientation θ exceeds 29.6 degrees, and increases slowly when the angle of orientation θ exceeds 43 degrees.

From FIG. 10, it was found that torque increases slowly as the angle of orientation θ of the second permanent magnet segments 11 increases from 0 degrees, reaches a maximum value when the angle of orientation θ is 37 degrees, and decreases slowly when the angle of orientation θ exceeds 37 degrees.

Consequently, from FIGS. 8 through 10, a rotary electric machine that has reduced cogging torque and increased torque can be achieved by setting the angle of orientation θ of the second permanent magnet segments 11 to greater than or equal to 15 degrees and less than or equal to 43 degrees.

Embodiment 2

Figure 11:
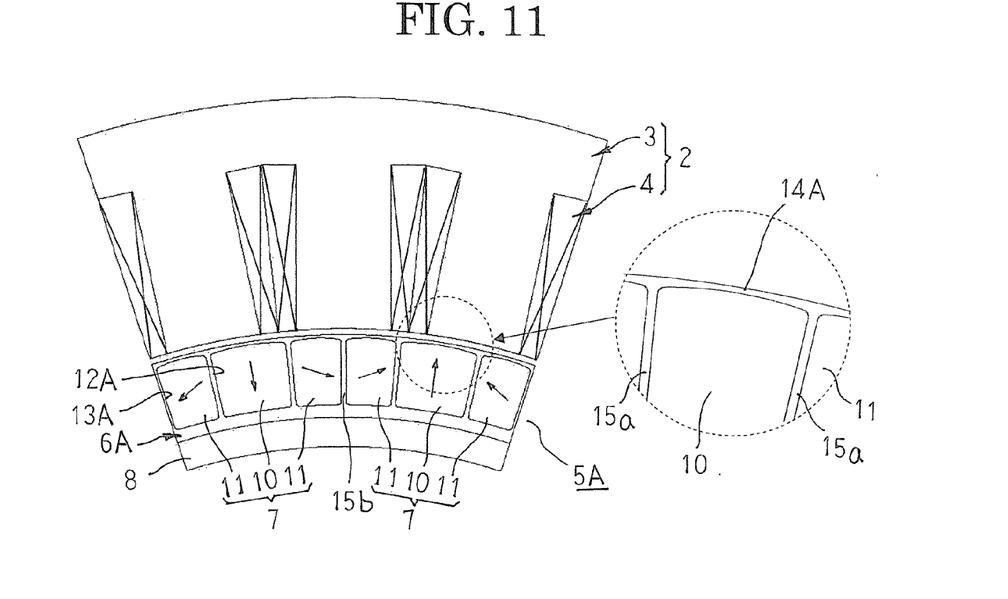
FIG. 11 is a partial cross section that shows an embedded permanent magnet rotary electric machine according to Embodiment 2 of the present invention.

FIG. 11 is a partial cross section that shows an embedded permanent magnet rotary electric machine according to Embodiment 2 of the present invention.

In FIG. 11, outer circumferential bridges 14A are formed into arch shapes in which a thickness thereof becomes gradually thinner from two circumferential ends toward a central portion. The thickness at the two circumferential end portions of the outer circumferential bridges 14A match the thickness at the two circumferential end portions of the outer circumferential bridges 14 in Embodiment 1 above.

Moreover, the rest of the configuration is formed in a similar or identical manner to that of Embodiment 1 above.

According to Embodiment 2, because the outer circumferential bridges 14A are formed into arch shapes in which a thickness thereof becomes gradually thinner from two circumferential ends toward a central portion, local concentrations of stress onto the two circumferential end portions of the outer circumferential bridges 14A are relieved, enabling the stresses that act on the outer circumferential bridges 14A to be made uniform. Consequently, in Embodiment 2, resistance of a rotor core 6A to centrifugal forces is also increased, enabling a rotor 5A that can handle high-speed rotation to be achieved.

The thicknesses of the two circumferential end portions of the arch-shaped outer circumferential bridges 14A are equal to the thicknesses of the two circumferential end portions of the outer circumferential bridges 14 in Embodiment 1 above. Thus, aperture cross-sectional areas of the magnet holding apertures 12A and 13A, i.e., the cross-sectional areas of the first permanent magnet segments 10A and the second permanent magnet segments 11A, can be increased without enlarging the outside diameter of the rotor core 6A, and without increasing leakage of the magnetic flux from the outer circumferential bridges 14A to the inter-magnet ribs 15a and the interpolar ribs 15b, enabling torque to be increased.

Now, the price of dysprosium (Dy), which effectively improves holding force, is rising, and adoption of dysprosium-less magnets is being investigated. Since demagnetization characteristics of dysprosium-less magnets are inferior compared to dysprosium magnets, the volumes of the magnets must be increased to compensate for inferior demagnetization characteristics. In Embodiment 1, increasing the volumes of the magnets, i.e., increasing the thicknesses of the magnets, without increasing the outside diameter of the rotor core 6, would lead to reducing the thicknesses of the outer circumferential bridges 14, and also lead to reductions in the strength of the rotor core 6.

In this rotor core 6A, because the volumes of the magnets can be increased, i.e., the thicknesses of the magnets can be increased, without enlarging the outside diameter, as described above, the present rotor core 6A is suitable as a rotary electric machine for the adoption of dysprosium-less magnets.

Embodiment 3

Figure 12:
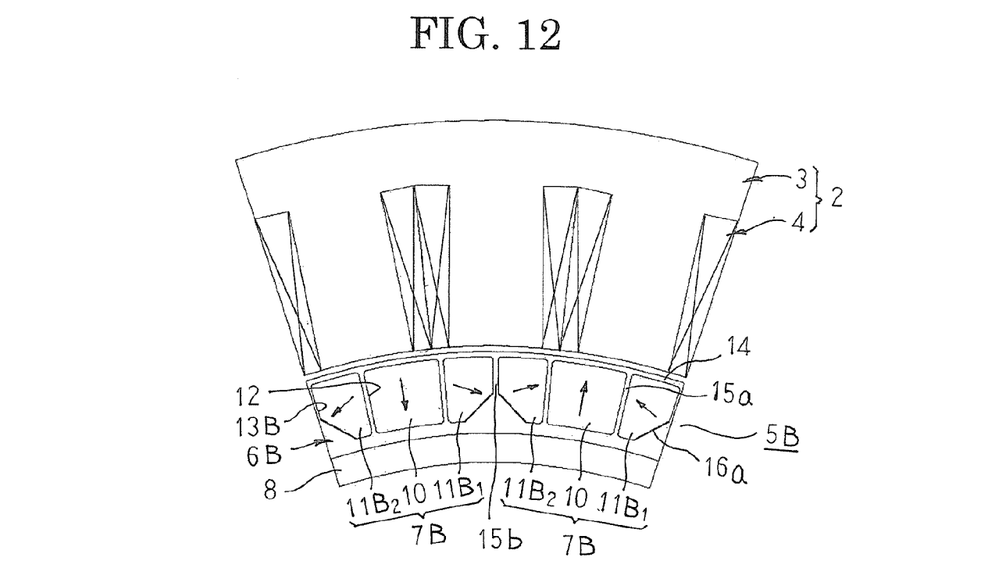
FIG. 12 is a partial cross section that shows an embedded permanent magnet rotary electric machine according to Embodiment 3 of the present invention.

FIG. 12 is a partial cross section that shows an embedded permanent magnet rotary electric machine according to Embodiment 3 of the present invention.

In FIG. 12, chamfered portions 16a that function as first notches are formed on second permanent magnet segments $11B_1$ and $11B_2$ that are disposed on two circumferential sides of first permanent magnet segments 10 by cutting away corner portions at which the circumferentially outer surfaces and the inner circumferential surfaces of the second permanent magnet segments 11 in Embodiment 1 intersect. Magnet holding apertures 12B are formed so as to have aperture shapes that can accommodate the second permanent magnet segments $11B_1$ and $11B_2$.

Moreover, the rest of the configuration is formed in a similar or identical manner to that of Embodiment 1 above.

In Embodiment 3, shapes, directions of orientation, and directions of magnetization of permanent magnets 7B that are constituted by the first permanent magnet segments 10 and the second permanent magnet segments $11B_1$ and $11B_2$ are also configured so as to have mirror symmetry relative to planes that pass through the centers of the magnetic poles and that include the central axis of a rotor core 6B. In addition, the shapes and directions of orientation of circumferentially adjacent permanent magnets 7B are configured so as to have mirror symmetry relative to planes that pass through the centers of interpolar ribs 15b and that include the central axis of the rotor core 6B.

According to Embodiment 3, because the chamfered portions 16a of the second permanent magnet segments $11B_1$ and $11B_2$ are formed by cutting away the radially inner corner portions on the circumferentially outer sides of the fan-shaped cross sections, magnet segments that are disposed on first circumferential sides of the first permanent magnet segments 10 and magnet segments that are disposed on second circumferential sides thereof can be distinguished simply from outward appearances. Thus, the occurrence of misassembly of the second permanent magnet segments $11B_1$ and $11B_2$ can be suppressed, improving assembly of the rotor 5B. Furthermore, devices that apply markings that specify the circumferential position of the second permanent magnet segments $11B_1$ and $11B_2$ relative to the first permanent magnet segments 10, and devices that check the directions of orientation of the second permanent magnet segments $11B_1$ and $11B_2$, are no longer required.

Moreover, in adjacent permanent magnets 7B, the directions of magnetization of the second permanent magnet segments $11B_1$ are different than each other but the directions of orientation thereof are identical to each other, and likewise for the second permanent magnet segments $11B_2$. Thus, even if the second permanent magnet segments $11B_1$ are replaced with each other, or the second permanent magnet segments $11B_2$ are replaced with each other, in adjacent permanent magnets 7B, no problems will arise if the permanent magnets 7B are magnetized after being mounted into the rotor core 6B.

Figure 13:
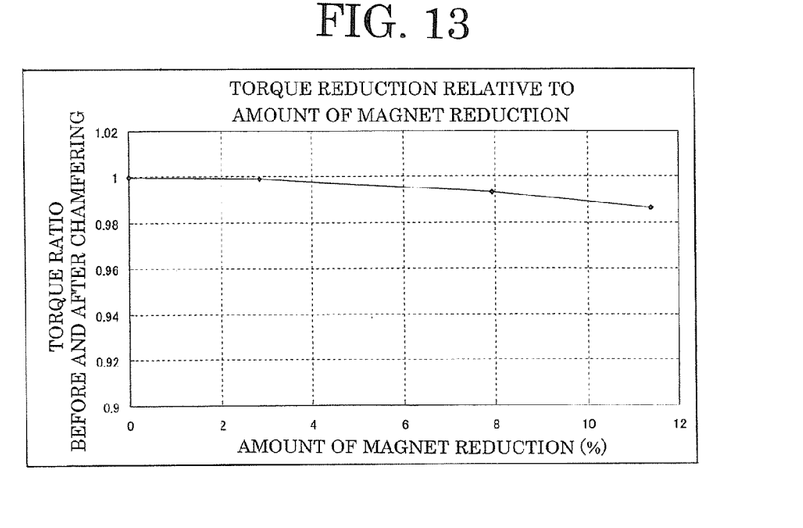
FIG. 13 is a graph that shows results of measuring torque with different amounts of notching.

Next, a relationship between the chamfered portions 16a and torque will be investigated based on FIG. 13. FIG. 13 is a graph that shows results of measuring torque with different amounts of chamfering. Moreover, the horizontal axis represents magnet reduction percentage, and the vertical axis represents a relative value of torque, where 1 is the torque when second permanent magnet segments without chamfering are used. The magnet reduction percentage is the weight of a second permanent magnet without chamfering divided by the weight of a second permanent magnet after chamfering, times 100.

From FIG. 13, it was ascertained that torque decreases gradually as the magnet reduction percentage is increased. When the magnet reduction percentage was eight percent, the reduction in torque was less than one percent.

Thus, reductions in the torque of the rotary electric machine can be suppressed even if the chamfered portions 16a are formed. Because the weight of the second permanent magnet segments $11B_1$ and $11B_2$ is reduced by forming the chamfered portions 16a, resistance of the rotor core 6B to centrifugal forces is increased, enabling a rotor 5B that can handle high-speed rotation to be obtained, and also enabling reductions in magnet cost to be achieved.

Figure 14:
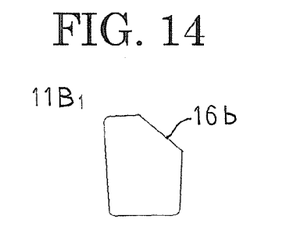
FIG. 14 is a cross section that shows a variation of a second permanent magnet segment that is used in an embedded permanent magnet rotary electric machine according to Embodiment 3 of the present invention.
Figure 15:
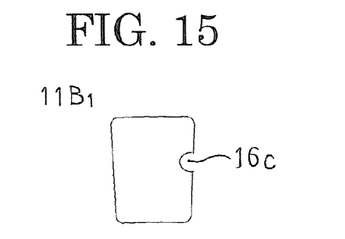
FIG. 15 is a cross section that shows another variation of a second permanent magnet segment that is used in an embedded permanent magnet rotary electric machine according to Embodiment 3 of the present invention.

Moreover, in Embodiment 3 above, the chamfered portions 16a are formed on intersecting portions between circumferentially outer surfaces and inner circumferential surfaces of the second permanent magnet segments $11B_1$ and $11B_2$, but the positions of formation of the first notches are not limited thereto. For example, chamfered portions 16b that function as a first notch may be formed at an intersecting portion between a circumferentially outer surface and an outer circumferential surface of a second permanent magnet segment $11B_1$, as shown in FIG. 14, or a semicircular first notch 16c may be formed at a radially central position of a circumferentially outer surface of a second permanent magnet segment $11B_1$, as shown in FIG. 15.

Embodiment 4

Figure 16:
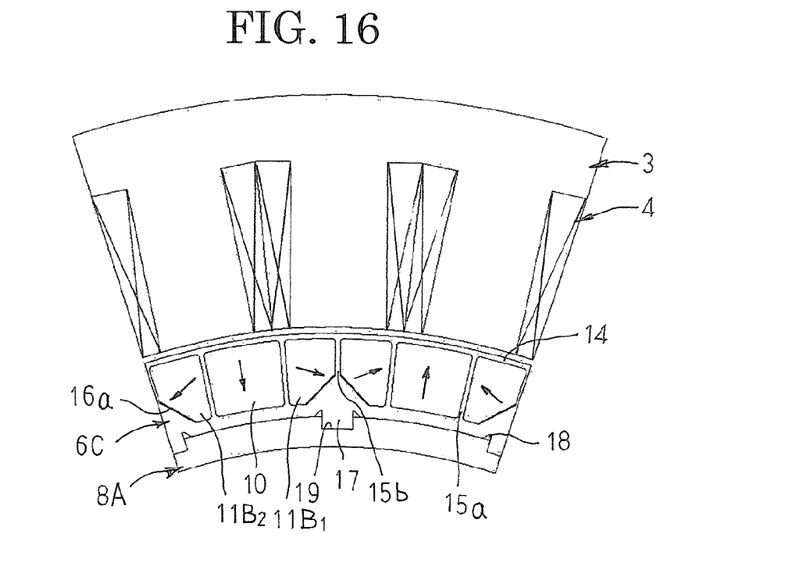
FIG. 16 is a partial cross section that shows an embedded permanent magnet rotary electric machine according to Embodiment 4 of the present invention.

FIG. 16 is a partial cross section that shows an embedded permanent magnet rotary electric machine according to Embodiment 4 of the present invention.

In FIG. 16, key portions 17 are disposed so as to protrude from a rotor core 6C radially inside interpolar ribs 15b, and keyway recesses 18 are recessed into the rotor core 6C at root portions of the key portions 17. Keyways 19 are recessed into an outer circumferential surface of a boss portion 8A so as to be able to interfit with the key portions 17.

Moreover, the rest of the configuration is formed in a similar or identical manner to that of Embodiment 3 above.

Because the chamfered portions 16a are formed on circumferentially outer sides of radially inner corner portions of the second permanent magnet segments 11B$_1$ and 11B$_2$, spaces between the chamfered portions 16a radially inside the interpolar ribs 15b become vacant spaces.

In Embodiment 4, because the key portions 17 and the keyway recess 18 are formed in the vacant spaces in question, portions that couple with the boss portion 8A can be formed on the rotor core 6C without increasing the diameter of the rotor core 6C.

Moreover, in Embodiment 4 above, a portion that couples with a boss portion is formed in a vacant space on a radially inner side of an interpolar rib, but a crimped portion that integrates a laminated body of electromagnetic steel sheets that form a rotor core may be formed in a vacant space on a radially inner side of an interpolar rib.

Embodiment 5

Figure 17:
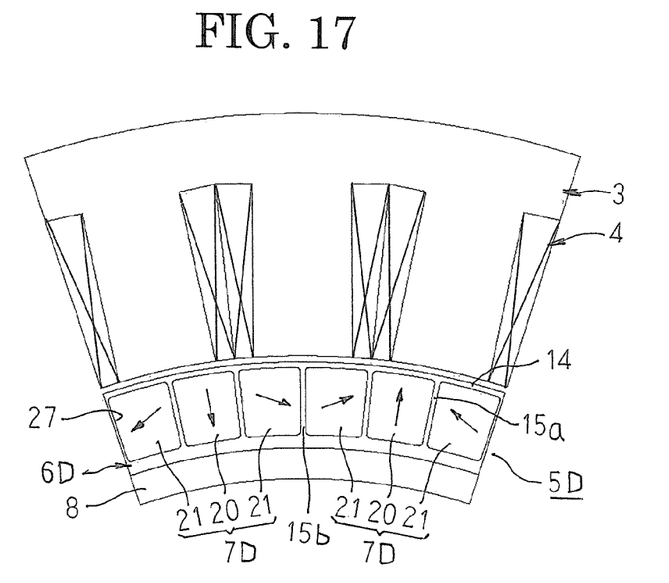
FIG. 17 is a partial cross section that shows an embedded permanent magnet rotary electric machine according to Embodiment 5 of the present invention.

FIG. 17 is a partial cross section that shows an embedded permanent magnet rotary electric machine according to Embodiment 5 of the present invention.

In FIG. 17, permanent magnets 7D that constitute single magnetic poles are constituted by: first permanent magnet segments 20; and second permanent magnet segments 21 that are disposed on two circumferential sides of the first permanent magnet segments 20. The first permanent magnet segments 20 and the second permanent magnet segments 21 are produced into identical cross-sectional shapes, and are individually accommodated and held in magnet holding apertures 27.

Moreover, the rest of the configuration is formed in a similar or identical manner to that of Embodiment 1 above.

In Embodiment 1 above, because the first permanent magnet segments 10 are larger than the second permanent magnet segments 11, large centrifugal forces act through the first permanent magnet segments 10 on the outer circumferential bridges 14 on the outer circumferential sides of the first permanent magnet segments 10 during high-speed rotation. Thus, stress is concentrated at the outer circumferential bridges 14 on the outer circumferential sides of the first permanent magnet segments 10.

In Embodiment 5, because first permanent magnet segments 20 and second permanent magnet segments 21 are equal in size, if the permanent magnets 7D that constitute single magnetic poles are equal in volume to the permanent magnets 7 in Embodiment 1, then the volumes of the first permanent magnet segments 20 and the second permanent magnet segments 22 are smaller than that of the first permanent magnet segments 10. Thus, centrifugal forces that act on the outer circumferential bridges 14 through the first permanent magnet segments 20 or the second permanent magnet segments 21 during high-speed rotation are smaller than the centrifugal forces that act on the outer circumferential bridges 14 through the first permanent magnet segments 10. Thus, because stresses act uniformly on the three outer circumferential bridges 14 that are positioned on outer circumferential sides of the first permanent magnet segments 20 and the second permanent magnet segments 21, and local concentrations of stress are relieved, resistance of a rotor core 6D to centrifugal forces is increased, enabling a rotor 5D that can handle high-speed rotation to be obtained.

Embodiment 6

Figure 18:
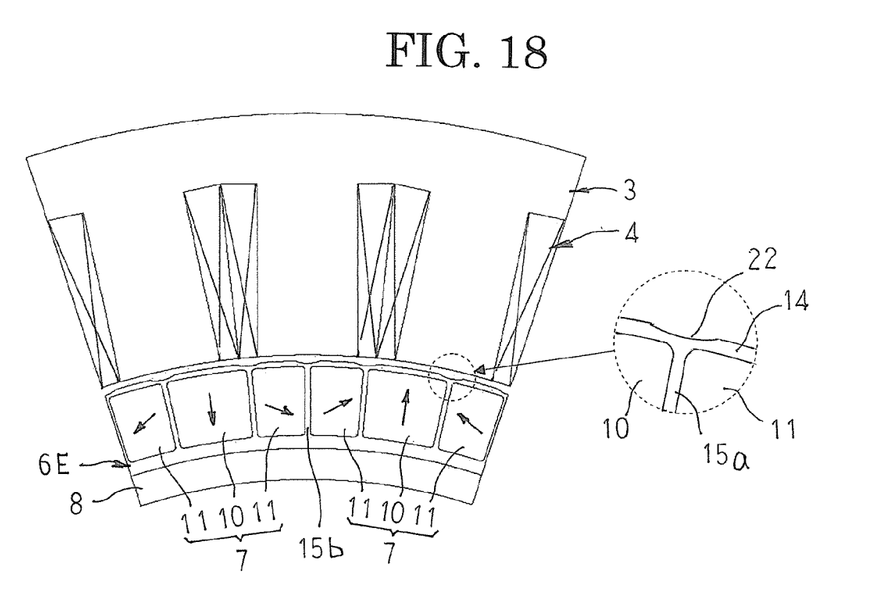
FIG. 18 is a partial cross section that shows an embedded permanent magnet rotary electric machine according to Embodiment 6 of the present invention.

FIG. 18 is a partial cross section that shows an embedded permanent magnet rotary electric machine according to Embodiment 6 of the present invention.

In FIG. 18, second notches 22 are recessed into an outer circumferential surface of a rotor core 6E radially outside inter-magnet ribs 15a and interpolar ribs 15b so as to have circular arc shapes.

Moreover, the rest of the configuration is formed in a similar or identical manner to that of Embodiment 1 above.

According to Embodiment 6, because the second notches 22 are recessed radially outside the inter-magnet ribs 15a and the interpolar ribs 15b, magnetic resistance in linking portions between the outer circumferential bridges 14 and the inter-magnet ribs 15a and between the outer circumferential bridges 14 and the interpolar ribs 15b is increased. Consequently, magnetic leakage flux that flows to the inter-magnet ribs 15a and the interpolar ribs 15b from the outer circumferential bridges 14 is reduced, enabling increased torque to be achieved.

Embodiment 7

Figure 19:
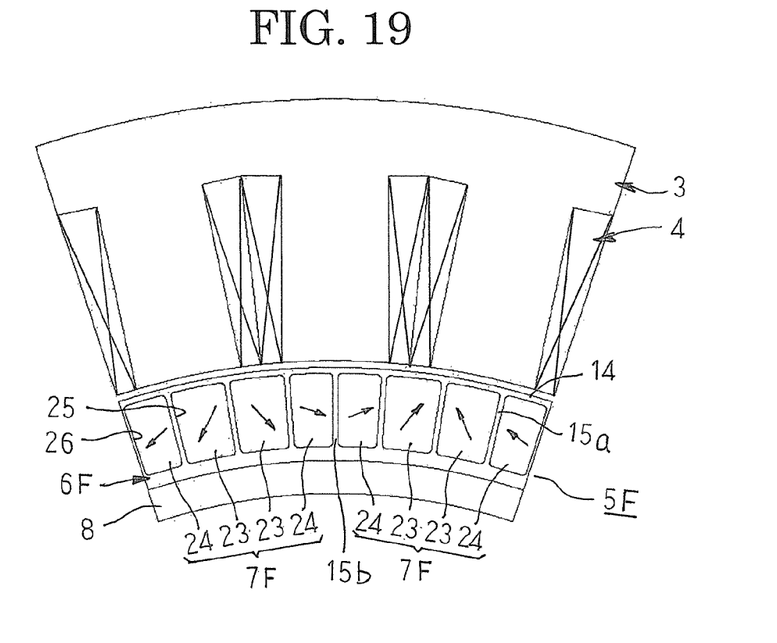
FIG. 19 is a partial cross section that shows an embedded permanent magnet rotary electric machine according to Embodiment 7 of the present invention.

FIG. 19 is a partial cross section that shows an embedded permanent magnet rotary electric machine according to Embodiment 7 of the present invention.

In FIG. 19, permanent magnets 7F that constitute magnetic poles are constituted by: two first permanent magnet segments 23 that are disposed so as to be circumferentially adjacent; and two second permanent magnet segments 24 that are disposed on two circumferential sides of the two first permanent magnet segments 23. Moreover, the first permanent magnet segments 23 have fan-shaped cross sections in which radial widths are equal to those of the second permanent magnet segments 24, and circumferential widths are wider than those of the second permanent magnet segments 24. The second permanent magnet segments 24 have fan-shaped cross sections in which radial widths are wider than circumferential widths. An angle of orientation θ of the first permanent magnet segments 23 is greater than an angle of orientation θ of the second permanent magnet segments 24.

Moreover, shapes, directions of orientation, and directions of magnetization of the permanent magnets 7F are configured so as to have mirror symmetry relative to planes that pass through the centers of the magnetic poles and that include the central axis of the rotor core 6F. In addition, the shapes and directions of orientation of circumferentially adjacent permanent magnets 7F are configured so as to have mirror symmetry relative to planes that pass through the centers of interpolar ribs 15b and that include the central axis of the rotor core 6F.

The permanent magnets 7F are arranged at a uniform angular pitch on the rotor core 6F such that polarity of an outer circumferential portion of the rotor core 6F at the centers of the magnetic poles is aligned alternately into North-seeking (N) poles and South-seeking (S) poles circumferentially.

Moreover, the rest of the configuration is formed in a similar or identical manner to that of Embodiment 1 above.

In Embodiment 7, the permanent magnets 7F that constitute single magnetic poles are configured so as to be divided into two first permanent magnet segments 23 and two second permanent magnet segments 24, and the first permanent magnet segments 23 and the second permanent magnet segments 24 are housed and held in the magnet holding apertures 25 and 26, respectively. Thus, the moments that act on the inter-magnet ribs 15a and the interpolar ribs 15b through the outer circumferential bridges 14 during high-speed rotation are reduced, increasing resistance of the rotor core 6F to centrifugal forces, and enabling a rotor 5F that can handle high-speed rotation to be obtained.

Because the radial widths of the second permanent magnet segments 24 are formed so as to be wider than the circumferential widths, volume is equal and cross-sectional area perpendicular to the direction of orientation is increased compared to when the radial widths and the circumferential widths are equal, increasing the amount of magnetic flux, and enabling increased torque to be achieved.

Because the angle of orientation θ of the first permanent magnet segments 23 is greater than the angle of orientation θ of the second permanent magnet segments 24, and the directions of orientation of the first permanent magnet segments 23 and the second permanent magnet segments 24 that constitute the permanent magnets 7F have mirror symmetry relative to planes that pass through the centers of the magnetic poles and that include the central axis of the rotor core 6F, the amount of magnetic flux is increased, enabling increased torque to be achieved, and open flux also approaches a sine wave, reducing torque ripple.

Embodiment 8

Figure 20:
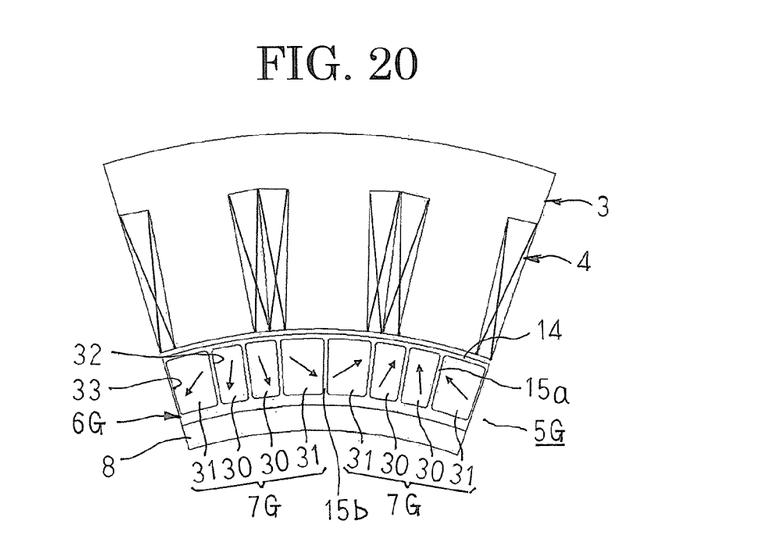
FIG. 20 is a partial cross section that shows an embedded permanent magnet rotary electric machine according to Embodiment 8 of the present invention.

FIG. 20 is a partial cross section that shows an embedded permanent magnet rotary electric machine according to Embodiment 8 of the present invention.

In FIG. 20, permanent magnets 7G that constitute magnetic poles are constituted by: two first permanent magnet segments 30 that are disposed so as to be circumferentially adjacent; and two second permanent magnet segments 31 that are disposed on two circumferential sides of the two first permanent magnet segments 30. The first permanent magnet segments 30 are produced so as to have fan-shaped cross sections that are formed by dividing the first permanent magnet segments 10 in Embodiment 1 above into two equal sections circumferentially. Specifically, the volumes of the first permanent magnet segments 30 are smaller by an amount proportionate to the inter-magnet ribs 15a. The second permanent magnet segments 31 are produced so as to have fan-shaped cross sections that are identical to those of the second permanent magnet segments 11 in Embodiment 1 above. An angle of orientation θ of the first permanent magnet segments 30 is greater than an angle of orientation θ of the second permanent magnet segments 31.

Moreover, shapes, directions of orientation, and directions of magnetization of the permanent magnets 7G are configured so as to have mirror symmetry relative to planes that pass through the centers of the magnetic poles and that include the central axis of the rotor core 6G. In addition, the shapes and directions of orientation of circumferentially adjacent permanent magnets 7G are configured so as to have mirror symmetry relative to planes that pass through the centers of interpolar ribs 15b and that include the central axis of the rotor core 6G.

The permanent magnets 7G are arranged at a uniform angular pitch on the rotor core 6G such that polarity of an outer circumferential portion of the rotor core 6G at the centers of the magnetic poles is aligned alternately into North-seeking (N) poles and South-seeking (S) poles circumferentially.

Moreover, the rest of the configuration is formed in a similar or identical manner to that of Embodiment 1 above.

In Embodiment 8, the permanent magnets 7G that constitute single magnetic poles are configured so as to be divided into two first permanent magnet segments 30 and two second permanent magnet segments 31, and the first permanent magnet segments 30 and the second permanent magnet segments 31 are housed and held in the magnet holding apertures 32 and 33, respectively. Thus, the moments that act on the inter-magnet ribs 15a and the interpolar ribs 15b through the outer circumferential bridges 14 during high-speed rotation are reduced, increasing resistance of the rotor core 6G to centrifugal forces, and enabling a rotor 5G that can handle high-speed rotation to be obtained.

Because the radial widths of the second permanent magnet segments 31 are formed so as to be wider than the circumferential widths, volume is equal and cross-sectional area perpendicular to the direction of orientation is increased compared to when the radial widths and the circumferential widths are equal, increasing the amount of magnetic flux, and enabling increased torque to be achieved.

Because the angle of orientation θ of the first permanent magnet segments 30 is greater than the angle of orientation θ of the second permanent magnet segments 31, and the directions of orientation of the first permanent magnet segments 30 and the second permanent magnet segments 31 that constitute the permanent magnets 7G have mirror symmetry relative to planes that pass through the centers of the magnetic poles and that include the central axis of the rotor core 6G, the amount of magnetic flux is increased, enabling increased torque to be achieved, and open flux also approaches a sine wave, reducing torque ripple.

Figure 21:
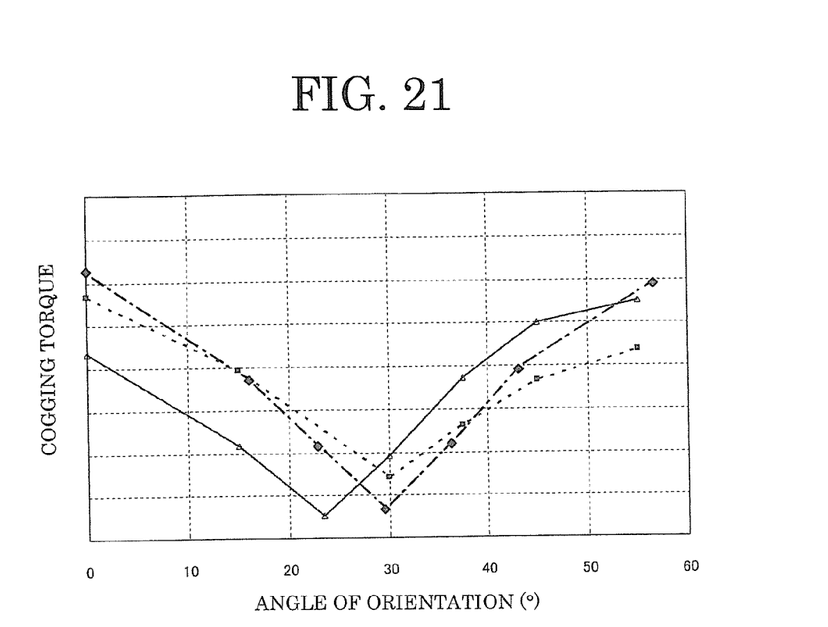
FIG. 21 is a graph that shows results of measuring cogging torque with different angles of orientation θ of the second permanent magnet segments.
Figure 22:
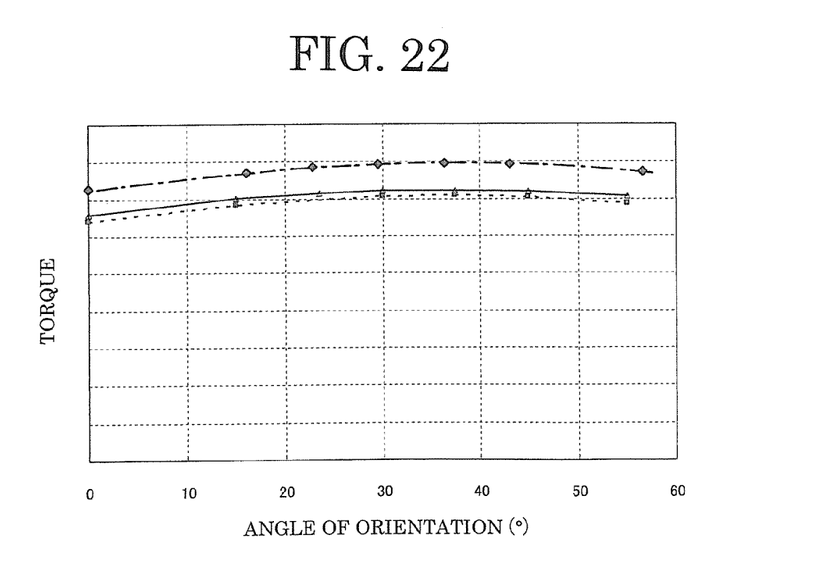
FIG. 22 is a graph that shows results of measuring torque with different angles of orientation θ of the second permanent magnet segments.

Relationships between angle of orientation θ of the second permanent magnet segments 31 and cogging torque and between angle of orientation θ and torque will now be investigated. FIG. 21 is a graph that shows results of measuring cogging torque with different angles of orientation θ of the second permanent magnet segments, and FIG. 22 is a graph that shows results of measuring torque with different angles of orientation θ of the second permanent magnet segments. In FIGS. 21 and 22, broken lines represent a case in which the angle of orientation θ of the first permanent magnet segments was 90 degrees, and solid lines represent a case in which the angle of orientation θ of the first permanent magnet segments was 70 degrees. Furthermore, for comparison, measured results from Embodiment 1 have been represented by a dotted chain line. Moreover, a stator that has an outside diameter of ø 290 mm and an inside diameter of ø 212 mm, a rotor that has an outside diameter of ø 210 mm and an inside diameter of ø 182 mm, and magnets that have a residual magnetic flux density of 0.875 T were used.

From FIG. 21, it was found that if the angle of orientation θ of the first permanent magnet segments 30 is 90 degrees, the cogging torque decreases slowly as the angle of orientation θ of the second permanent magnet segments 30 increases from 0 degrees, decreases rapidly when the angle of orientation θ exceeds 15 degrees, reaches a minimum value when the angle of orientation θ is 30 degrees, increases rapidly when the angle of orientation θ exceeds 30 degrees, and increases slowly when the angle of orientation θ exceeds 45 degrees.

From this it was ascertained that if the angle of orientation θ of the first permanent magnet segments 30 is 90 degrees, then reduced cogging torque can be achieved by setting the angle of orientation θ of the second permanent magnet segments 31 to greater than or equal to 15 degrees and less than or equal to 43 degrees, in a similar or identical manner to that of Embodiment 1. If the angle of orientation θ of the first permanent magnet segments 30 is 90 degrees, the minimum value of cogging torque is increased compared to that in Embodiment 1. This can be inferred to be due to the presence of the inter-magnet ribs 15a at the pole centers due to dividing the first permanent magnet segments 10 into the two first permanent magnet segments 30.

From FIG. 21, it was found that if the angle of orientation θ of the first permanent magnet segments 30 is 70 degrees, the cogging torque decreases slowly as the angle of orientation θ of the second permanent magnet segments 30 increases from 0 degrees, decreases rapidly when the angle of orientation θ exceeds 15 degrees, reaches a minimum value when the angle of orientation θ is 23 degrees, increases rapidly when the angle of orientation θ exceeds 23 degrees, and increases slowly when the angle of orientation θ exceeds 45 degrees. It was also found that cogging torque is reduced by making the angle of orientation θ of the first permanent magnet segments 30 less than 90 degrees, and the angle of orientation θ of the second permanent magnet segments 31 at which the cogging torque is minimized is reduced.

From FIG. 21, it was ascertained that if the angle of orientation θ of the first permanent magnet segments 30 is 70 degrees, reduced cogging torque can be achieved by setting the angle of orientation θ of the second permanent magnet segments 31 to greater than or equal to 15 degrees and less than or equal to 30 degrees.

From FIG. 22, it was found that if the angle of orientation θ of the first permanent magnet segments 30 is 90 degrees or 70 degrees, torque increases slowly as the angle of orientation θ of the second permanent magnet segments 31 increases from 0 degrees, reaches a maximum value when the angle of orientation θ is 37 degrees, and decreases slowly when the angle of orientation θ exceeds 37 degrees. If the angle of orientation θ of the first permanent magnet segments 30 is 90 degrees or 70 degrees, torque is reduced compared to that in Embodiment 1. This can be inferred to be due to the magnet volume of the first permanent magnet segments 30 being reduced by an amount proportionate to the inter-magnet ribs 15a compared to the first permanent magnet segments 10.

Consequently, if the angle of orientation θ of the first permanent magnet segments 30 is 90 degrees, then a rotary electric machine that has reduced cogging torque and increased torque can be obtained by setting the angle of orientation θ of the second permanent magnet segments 31 to greater than or equal to 15 degrees and less than or equal to 43 degrees, in a similar or identical manner to that of Embodiment 1.

Furthermore, if the angle of orientation θ of the first permanent magnet segments 30 is 70 degrees, a rotary electric machine that has reduced cogging torque can be obtained by setting the angle of orientation θ of the second permanent magnet segments 31 to greater than or equal to 15 degrees and less than or equal to 30 degrees.

Moreover, in each of the above embodiments, the permanent magnets in single magnetic poles are configured so as to be divided into three or four permanent magnet segments, but the number of permanent magnet sections that constitute a single magnetic pole is not limited to three or four, and may be five or more. In that case, the permanent magnet segment groups that constitute the permanent magnets in single magnetic poles should be configured such that the shapes and directions of orientation thereof have mirror symmetry relative to a plane that passes through the center of the magnetic pole and that includes a central axis of a rotor core, and the angles of orientation θ should be progressively smaller the further a permanent magnet segment is away from the center of the magnetic pole. Furthermore, if the number of permanent magnet segments that constitute the permanent magnets in single magnetic poles is an odd number, the angle of orientation θ of the permanent magnet that is positioned at the magnetic pole center is 90 degrees, i.e., the direction of orientation is a radial direction.

The invention claimed is:

1. An embedded permanent magnet rotary electric machine comprising:
   a stator including:
   an annular stator core; and
   a stator coil that is mounted onto said stator core; and
   a rotor including:
   a cylindrical rotor core; and
   a plurality of permanent magnets that constitute respective single magnetic poles that are embedded into an outer circumferential side of said rotor core so as to be arranged at a uniform angular pitch circumferentially,
   said rotor being rotatably disposed on an inner circumferential side of said stator,
   wherein:
   said permanent magnets that constitute said single magnetic poles are constituted by n permanent magnet segments that are arranged in a circular arc shape circumferentially, where n is an integer that is greater than or equal to 3;
   said n permanent magnet segments are individually accommodated and held in magnet holding apertures that are disposed through said rotor core so as to have aperture directions in an axial direction;
   said n permanent magnet segments are configured such that shapes and directions of orientation thereof have mirror symmetry relative to a plane that passes through a magnetic pole center and that includes a central axis of said rotor core;
   said n permanent magnet segments are oriented such that a permanent magnet segment that is further away from said magnetic pole center in a circumferential direction has a smaller angle of orientation; and
   said permanent magnet segment that is positioned further away from said magnetic pole center in said circumferential direction is produced so as to have an approximately fan-shaped cross-sectional shape in which a radial width is wider than a circumferential width,
   wherein said permanent magnet segment that is positioned farthest away from said magnetic pole center in said circumferential direction is configured so as to satisfy:

$d \cos θ + τ(\sin θ - 1) > 0$ where θ is said angle of orientation, d is said radial width, and τ is said circumferential width.

2. The embedded permanent magnet rotary electric machine according to claim 1, wherein an outer circumferential bridge that is positioned radially outside said magnet holding apertures of said rotor core is configured so as to have an arch shape in which a radial thickness become gradually thinner toward a center from two circumferential ends.

3. The embedded permanent magnet rotary electric machine according to claim 1, wherein there are three or four of said permanent magnet segments, and an angle of orientation of permanent magnet segments that are positioned at two circumferential ends is greater than or equal to 15 degrees and less than or equal to 43 degrees if an angle of orientation of a permanent magnet segment that is positioned at said magnetic pole center or of permanent magnet segments that are positioned near said magnetic pole center is 90 degrees.

4. The embedded permanent magnet rotary electric machine according to claim 1, wherein there are four of said permanent magnet segments, and an angle of orientation of permanent magnet segments that are positioned at two circumferential ends is greater than or equal to 15 degrees and less than or equal to 30 degrees if an angle of orientation of permanent magnet segments that are positioned near said magnetic pole center is 70 degrees.

5. An embedded permanent magnet rotary electric machine comprising:
a stator including:
an annular stator core; and
a stator coil that is mounted onto said stator core; and
a rotor including:
a cylindrical rotor core; and
a plurality of permanent magnets that constitute respective single magnetic poles that are embedded into an outer circumferential side of said rotor core so as to be arranged at a uniform angular pitch circumferentially,
said rotor being rotatably disposed on an inner circumferential side of said stator,
wherein:
said permanent magnets that constitute said single magnetic poles are constituted by n permanent magnet segments that are arranged in a circular arc shape circumferentially, where n is an integer that is greater than or equal to 3;
said n permanent magnet segments are individually accommodated and held in magnet holding apertures that are disposed through said rotor core so as to have aperture directions in an axial direction;
said n permanent magnet segments are configured such that shapes and directions of orientation thereof have mirror symmetry relative to a plane that passes through a magnetic pole center and that includes a central axis of said rotor core;
said n permanent magnet segments are oriented such that a permanent magnet segment that is further away from said magnetic pole center in a circumferential direction has a smaller angle of orientation; and
said permanent magnet segment that is positioned further away from said magnetic pole center in said circumferential direction is produced so as to have an approximately fan-shaped cross-sectional shape in which a radial width is wider than a circumferential width,
wherein a first notch is formed by cutting away a portion of a circumferential surface of permanent magnet segments that are positioned at two circumferential ends of said n permanent magnet segments.

6. The embedded permanent magnet rotary electric machine according to claim 5, wherein said first notch is formed by cutting away a corner portion of a circumferentially outer surface and an inner circumferential surface of said permanent magnet segments that are positioned at said two circumferential ends of said n permanent magnet segments.

7. The embedded permanent magnet rotary electric machine according to claim 1, wherein said n permanent magnet segments are produced so as to have identical cross-sectional shapes.

8. The embedded permanent magnet rotary electric machine according to claim 1, wherein a second notch is formed by cutting away in a circular arc shape a portion of an outer circumferential surface of said rotor core that is radially outside a rib that is positioned between said magnet holding apertures.

9. The embedded permanent magnet rotary electric machine according to claim 5, wherein a second notch is formed by cutting away in a circular arc shape a portion of an outer circumferential surface of said rotor core that is radially outside a rib that is positioned between said magnet holding apertures.

10. The embedded permanent magnet rotary electric machine according to claim 1, wherein at least two of said permanent magnet segments have different circumferential widths.

11. The embedded permanent magnet rotary electric machine according to claim 10, wherein at least one of the permanent magnet segments has a circumferential width wider than a radial width.

* * * * *